(12) United States Patent
Dispenza et al.

(10) Patent No.: US 8,864,486 B2
(45) Date of Patent: Oct. 21, 2014

(54) TWIN SCREW SHAFT SPACER BEARING

(71) Applicant: Corning Incorporated, Corning, NY (US)

(72) Inventors: Matthew Joseph Dispenza, Horseheads, NY (US); Christopher John Malarkey, Corning, NY (US); Kenneth Charles Sariego, Beaver Dams, NY (US)

(73) Assignee: Corning Incorporated, Corning, NY (US)

( * ) Notice: Subject to any disclaimer, the term of this patent is extended or adjusted under 35 U.S.C. 154(b) by 88 days.

(21) Appl. No.: 13/835,545

(22) Filed: Mar. 15, 2013

(65) Prior Publication Data

US 2014/0271969 A1 Sep. 18, 2014

(51) Int. Cl.
| | |
|---|---|
| *B29C 47/50* | (2006.01) |
| *B29C 47/08* | (2006.01) |
| *B29C 47/40* | (2006.01) |
| *B29C 47/36* | (2006.01) |

(52) U.S. Cl.
CPC .............. *B29C 47/404* (2013.01); *B29C 47/50* (2013.01); *B29C 47/0803* (2013.01); *B29C 47/0881* (2013.01); *B29C 47/365* (2013.01)
USPC ...................... 425/208; 425/381.2; 425/382.4; 425/226; 425/204; 425/207; 425/209; 264/177.11; 264/177.12; 366/82; 366/83; 366/84; 366/90; 366/71; 366/97; 366/196

(58) Field of Classification Search
CPC ............ B29C 47/0881; B29C 47/0803; B29C 47/365; B29C 47/404; B29C 47/50
USPC ........... 425/381.2, 382.4, 226, 204, 207, 208, 425/209; 264/177.11, 177.12; 366/82, 83, 366/84, 90, 71, 97, 196
See application file for complete search history.

(56) References Cited

U.S. PATENT DOCUMENTS

| | | | | |
|---|---|---|---|---|
| 5,044,757 | A | | 9/1991 | Dienst .............................. 366/76 |
| 5,055,027 | A | * | 10/1991 | Sato .............................. 425/197 |
| 5,125,824 | A | * | 6/1992 | Schaarschmidt ............. 425/203 |
| 5,962,036 | A | * | 10/1999 | Hauck ........................... 425/190 |
| 7,677,787 | B2 | | 3/2010 | Yamane et al. ................ 366/80 |
| 2012/0018168 | A1 | | 1/2012 | Denny .......................... 166/369 |

FOREIGN PATENT DOCUMENTS

DE        10163519         7/2003

OTHER PUBLICATIONS

DE10163519—Machine translation.

* cited by examiner

*Primary Examiner* — Joseph S Del Sole
*Assistant Examiner* — Lawrence D Hohenbrink, Jr.
(74) *Attorney, Agent, or Firm* — Charles A. Greene (57) ABSTRACT

A twin screw extruder includes a barrel having a chamber, a discharge port, an extrusion molding die coupled to the discharge port of the barrel, axially extending first and second screw shafts, and a screw shaft support. The screw shaft support includes first and second spacer bearings disposed on the first and second screw shafts, and a first cross member including first and second loops slidably coupled to the first and second spacer bearings. A second cross member is spaced apart from the first cross member by a connection member, and also includes first and second loops slidably coupled to the first and second spacer bearings. The connection member is situated between the first spacer bearing and the second spacer bearing, and connected to the first cross member and the second cross member.

24 Claims, 7 Drawing Sheets

TWIN SCREW SHAFT SPACER BEARING

BACKGROUND

1. Field

Exemplary embodiments of the present disclosure relate to a screw shaft support and a twin screw extruder machine (TSM) comprising the same.

2. Discussion of the Background

The manufacture of ceramic honeycomb structures may be accomplished by the process of plasticizing ceramic powder batch mixtures, extruding the mixtures through honeycomb extrusion dies to form honeycomb extrudate, and drying and firing the extrudate to produce ceramic honeycombs of high strength and thermal durability. The ceramic honeycombs thus produced are widely used as ceramic catalyst supports in motor vehicle exhaust systems, and as catalyst supports and wall-flow particulate filters for the removal of soot and other particulates from diesel engine exhausts.

Among the commercially successful processes for ceramic honeycomb manufacture are those that utilize large co-rotating twin screw extruders for the mixing and extruding of ceramic honeycomb extrudate. These machines offer the capability of homogenizing and plasticizing ceramic powder batch mixtures and pressure-forcing the mixtures through honeycomb extrusion dies, such as in a single continuous processing operation. The favorable economics of this approach extend from the high-volume production of honeycombs of relatively small diameter for automobile exhaust systems to the shaping of very large frontal area (VLFA) honeycombs for large diesel engine exhaust systems. Cylindrical honeycomb shapes having cross-sectional diameters measured transversely to the cylinder axis and direction of honeycomb channel orientation can range from as small as 5 cm up to 50 cm or more.

The rotating screws used in extruders commonly comprise a plurality of screw segments that are successively positioned, such as on a splined or keyed axial drive shaft, to form the entire screw. Screw segments may be made of any suitable material, such as metal or ceramic.

The above information disclosed in this Background section is only for enhancement of understanding of the background of the claimed invention and therefore it may contain information that does not form any part of the prior art nor what the prior art may suggest to a person of ordinary skill in the art.

SUMMARY

Exemplary embodiments of the present disclosure provide a screw shaft support configured to support twin screw shafts of a twin screw extruder.

Exemplary embodiments of the present disclosure also provide a twin screw extruder machine (TSM) comprising a screw shaft support to support the twin screw shafts of the TSM.

Additional features of the claimed invention will be set forth in the description which follows, and in part will be apparent from the description, or may be learned by practice of the claimed invention.

An exemplary embodiment discloses a screw shaft support configured to support twin screw shafts of a twin screw extruder. The screw shaft support includes a first spacer bearing configured to be disposed on a first screw shaft and a second spacer bearing configured to be disposed on a second screw shaft. The screw shaft support includes a first cross member comprising a first loop slidably coupled to the first spacer bearing and a second loop slidably coupled to the second spacer bearing. A second cross member is spaced apart from the first cross member by a connection member, the second cross member comprising a first loop slidably coupled to the first spacer bearing and a second loop slidably coupled to the second spacer bearing. The connection member is disposed between the first spacer bearing and the second spacer bearing, and the connection member has a first end connected to the first cross member and a second end connected to the second cross member.

An exemplary embodiment also discloses a twin screw extruder including a barrel having a chamber and a discharge port. The twin screw extruder includes an extrusion molding die coupled to the discharge port of the barrel, an axially extending first screw shaft, an axially extending second screw shaft, and the screw shaft support.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the claimed invention and are incorporated in and constitute a part of this specification, illustrate exemplary embodiments of the disclosure, and together with the description serve to explain the principles of the claimed invention.

DETAILED DESCRIPTION OF THE ILLUSTRATED EMBODIMENTS

The disclosure is described more fully hereinafter with reference to the accompanying drawings, in which exemplary embodiments are shown. The claims may, however, be embodied in many different forms and should not be construed as limited to the embodiments set forth herein. Rather, these embodiments are provided so that this disclosure is thorough, and will fully convey the scope of the claims to those skilled in the art. In the drawings, the size and relative sizes of layers and regions may be exaggerated for clarity. Like reference numerals in the drawings denote like elements.

It will be understood that when an element is referred to as being "on" or "connected to" another element, it can be directly on or directly connected to the other element, or intervening elements may be present. In contrast, when an element is referred to as being "directly on" or "directly connected to" another element, there are no intervening elements present. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

Figure 1:
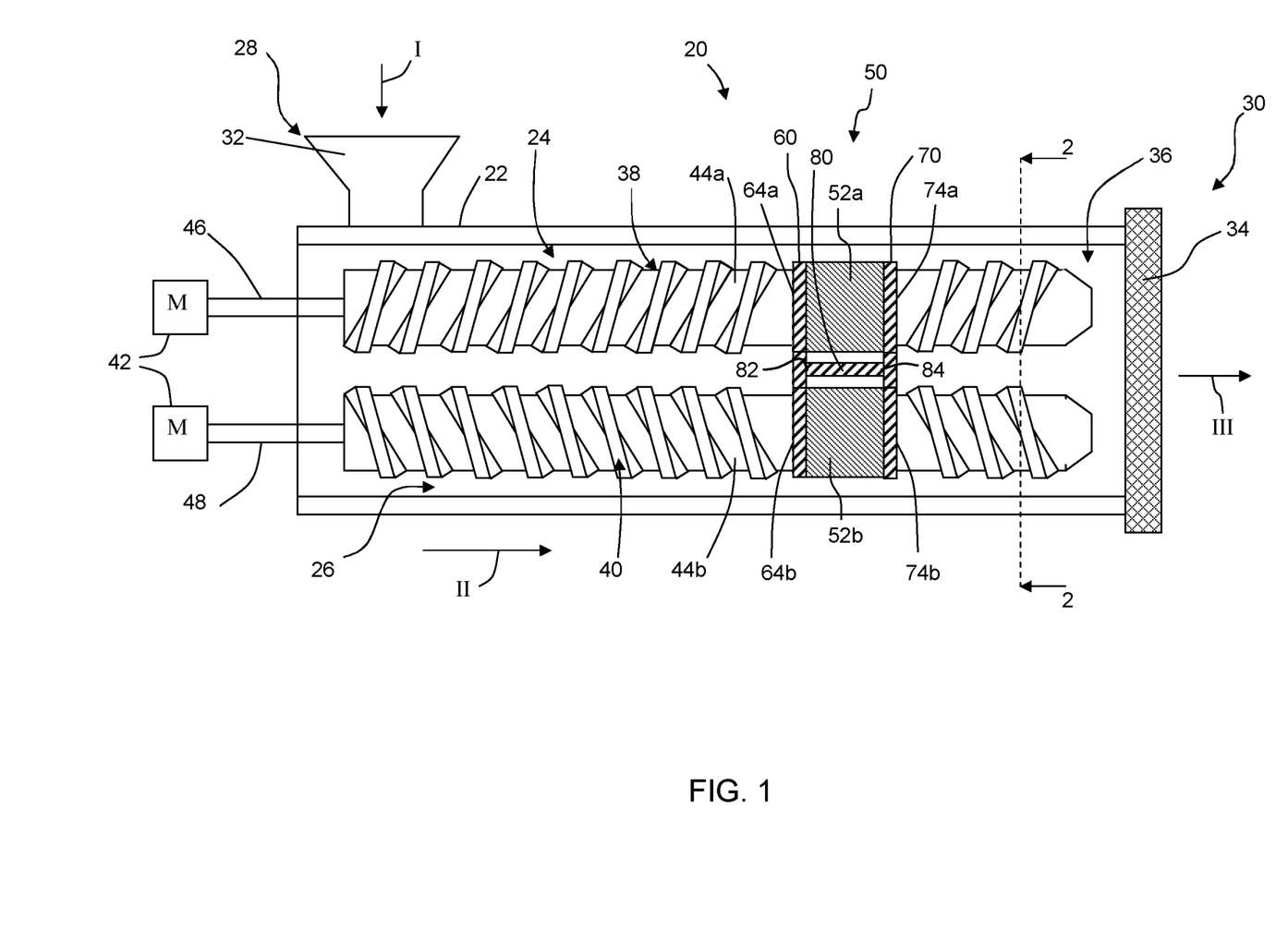
FIG. 1 is a schematic diagram of a twin screw extruder machine (TSM) including a screw shaft support according to exemplary embodiments of the disclosure.

FIG. 1 depicts an exemplary embodiment of a continuous twin-screw extruder 20. The twin-screw extruder 20 includes a barrel 22 including a pair of chambers 24, 26 formed therein and in communication with each other (see also FIG. 2). The barrel 22 can be monolithic, or can be formed from a plurality of barrel segments connected successively in the longitudinal (i.e., axial) direction. The chambers 24, 26 penetrate the barrel 22 in the longitudinal direction from an upstream side 28 to a downstream side 30. At the upstream side 28 of the barrel 22, a material supply port 32, which can include a hopper or other material supply structure, is provided for supplying the batch material to the extruder 20. An extrusion die 34 is provided at a discharge port 36 at the downstream side 30 of the barrel 22 for extruding the batch material into a desired shape, such as honeycomb article or the like. The extrusion die 34 can be coupled with respect to the discharge port 36 of the barrel 22, such as at an end of the barrel 22. The extrusion die 34 can be preceded by other structure, such as a generally open cavity (not shown), screen/homogenizer (not shown), or the like to facilitate the formation of a steady plug-type flow front before the batch reaches the extrusion die 34.

The extruder 20 can include various additional features. In one example, the extruder 20 can include a second supply port (not shown) at an intermediate portion of the barrel 22 for supplying additional batch material, additives, etc. to be processed by the extruder 20. In another example, the barrel 22 can include open vents (not shown) in communication with the chambers 24, 26 for degassing, and/or even a vacuum vent (not shown) for evacuating the chambers 24, 26 under vacuum. In addition or alternatively, a cooling pipe or the like (not shown) can be coupled to the barrel 22 for cooling, such as by cool water or the like, the batch material (not shown) being processed within the extruder 20. Still, the cooling pipe structure could alternatively be utilized to supply a hot medium, such as hot water or steam, to heat the batch material if desired.

A pair of extruder screw sets are mounted in the barrel 22. As shown, a first screw set 38 is rotatably mounted at least partially within one of the chambers 24, while a second screw set 40 is rotatably mounted at least partially within the other of the chambers 26. The first and second screw sets 38, 40 can be arranged generally parallel to each other, as shown, though they can also be arranged at various angles relative to each other. The first and second screw sets 38, 40 can also be coupled to a driving mechanism 42 outside of the barrel 22 for rotation in the same, or even different, directions. It is to be understood that the both of the first and second screw sets 38, 40 can be coupled to a single driving mechanism 42, or as shown, individual driving mechanisms 42.

Each of the first and second screw sets 38, 40 can include various segments extending along their longitudinal lengths, and each segment can impart various processes upon the batch located within the barrel 22. The first and second screw sets 38, 40 can be monolithic, having each of the segments formed with the screw sets 38, 40. Alternatively, as shown, each of the segments can be formed from a plurality of removable screw segments connected successively in the longitudinal (i.e., axial) direction (or even a combination of removable and non-removable segments). In one example, each of the first and second screw sets 38, 40 can include first and second drive shafts 46, 48, respectively, having a rotational axis generally aligned with the centers of the respective chambers 24, 26. The first and second drive shafts 46, 48 can have the plurality of screw segments removably coupled thereto in various manners. For example, the removable screw segments can be removably coupled via a spline shaft, keyway structure, set screws, etc. Still, any or all of the removable screw segments can be non-removably coupled to the drive shafts 46, 48, such as by adhesives, welding, etc.

The plurality of screw segments can include various types. For clarity, it is to be understood that substantially similar, such as identical or mirror twin, screw segments of each of the first and second screw sets 38, 40 will have similar reference numbers with respective "a" or "b" designations, with the understanding that any descriptions can apply to both such similar segments. In one example, a pumping screw segment 44a, 44b can be arranged generally towards the upstream side 28 of the extruder 20 for feeding the batch material from the supply port 32 and pumping or pushing the batch material towards the downstream side 30. The pumping screw segments 44a, 44b can include various single-flight or multi-flight spiral designs, as desired. Each of the pumping screw segments 44a, 44b can be of the meshing type having flights arranged so as to mesh with each other inside the barrel 22. For example, during rotation, one of the pumping screw segments 44a can scrape material off the other pumping screw segments 44b.

The ceramic batch material processed by the twin-screw extruder 20 (e.g., such as the cordierite batches) can be sensitive to the amount of shear mixing and/or temperature fluctuations that occurs inside the extruder 20, which can result in differential flows causing various internal defects at the exit of the extrusion die 34. Moreover, undesirable patterns and/or defects can be created in the cell walls of a honeycomb extrusion as a result of patterns in rheology of the batch slug that feeds the extrusion die 34. Such patterns can be impacted by mixing or shear stress distributions imparted to the batch from the twin-screw mixing and pumping of the twin-screw extruder 20. The patterns can also be impacted by temperature variations caused by the twin-screw mixing and/or the cooling system coupled to the barrel 22, such as a relatively hotter center batch and a relatively cooler skin. In various examples, the undesirable patterns and/or defects can include "swirl" patterns which result from the discharge of the batch from the screws 44a, 44b during each revolution, and/or swollen webs that buckle or become "wiggly" in the direction of flow. In addition or alternatively, other possible undesirable patterns and/or defects can include internal tearing, auger spots, and/ or fast-flow webs.

As a result, it can be beneficial to provide different screw segments located towards the downstream side 30 of the barrel 22 and near the discharge port 36 to promote a relatively more uniformly mixed and discharged batch material to reduce temperature, shear, and/or composition constituent gradients at the extruder outlet. As discussed more fully in U.S. Patent Application No. 2009/0052206, which is fully incorporated herein by reference, for example, the different screw segments located towards the downstream side 30 of the barrel 22 can provide efficient pumping of the ceramic batch material under relatively high pressures (e.g., 1,000-5, 000 psi) while reducing, such as minimizing, energy input and while promoting relatively more uniform dispersive and distributive mixing. In addition or alternatively, the operating pressure can be reduced, the overall temperature can be reduced, and/or the temperature fluctuations can be reduced.

Figure 2:
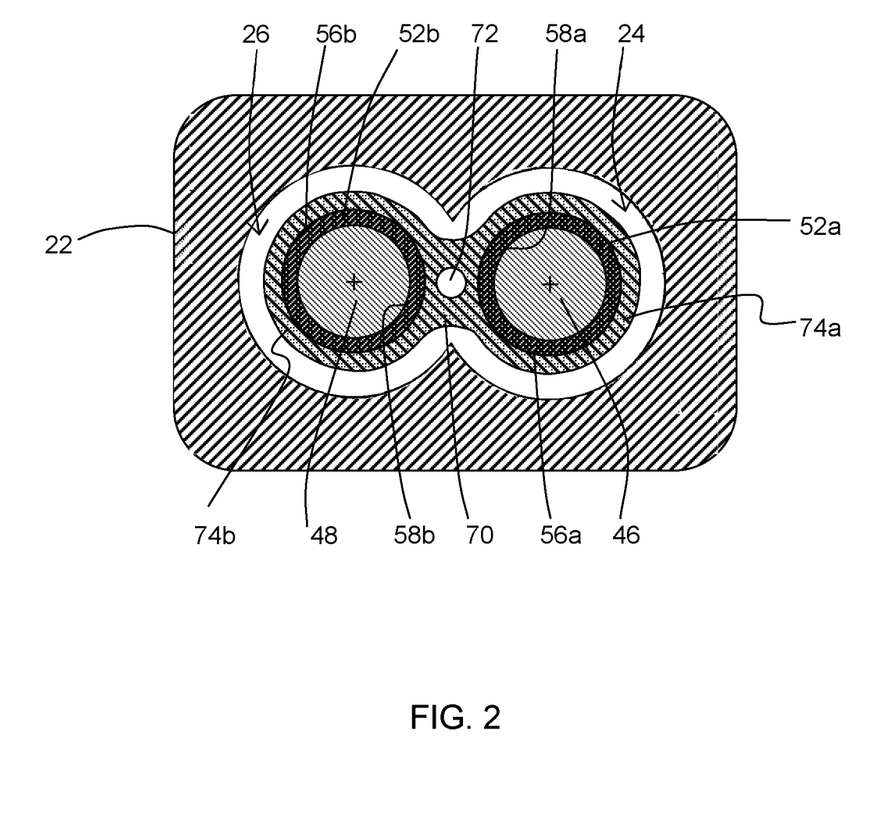
FIG. 2 is a front sectional schematic view taken along line 2-2 of FIG. 1 illustrating a screw shaft support according to exemplary embodiments of the disclosure.

As shown in FIGS. 1 and 2, the twin screw extruder machine (TSM) 20 includes a screw shaft support 50 that enables dual shaft coupling and alignment during extrusion operations according to exemplary embodiments. Typically, the shafts 46, 48 and screw sets 38, 40 in a twin screw process are separated only by the material that is being pumped.

Screw sets 38, 40 are assembled onto the two independent shafts 46, 48 and during normal operation are only constrained by the barrel walls 22 and the opposing elements on the other shaft. The independent shafts 46, 48 may be free floating as they turn and they can move around 1 mm in any direction. In this configuration, the shafts 46, 48 or screw sets 38, 40 may grind on the barrel wall 22 and opposing elements. This free floating of each shaft may allow elements from each shaft to contact each other and cause wear, chipping, increased extrusion heat, non-uniform flow, etc. This illustrated exemplary embodiment of a screw shaft support 50 enables rigid placement and displacement of each shaft relative to the other and therefore eliminates the shaft to shaft contact that may occur.

Figure 3:
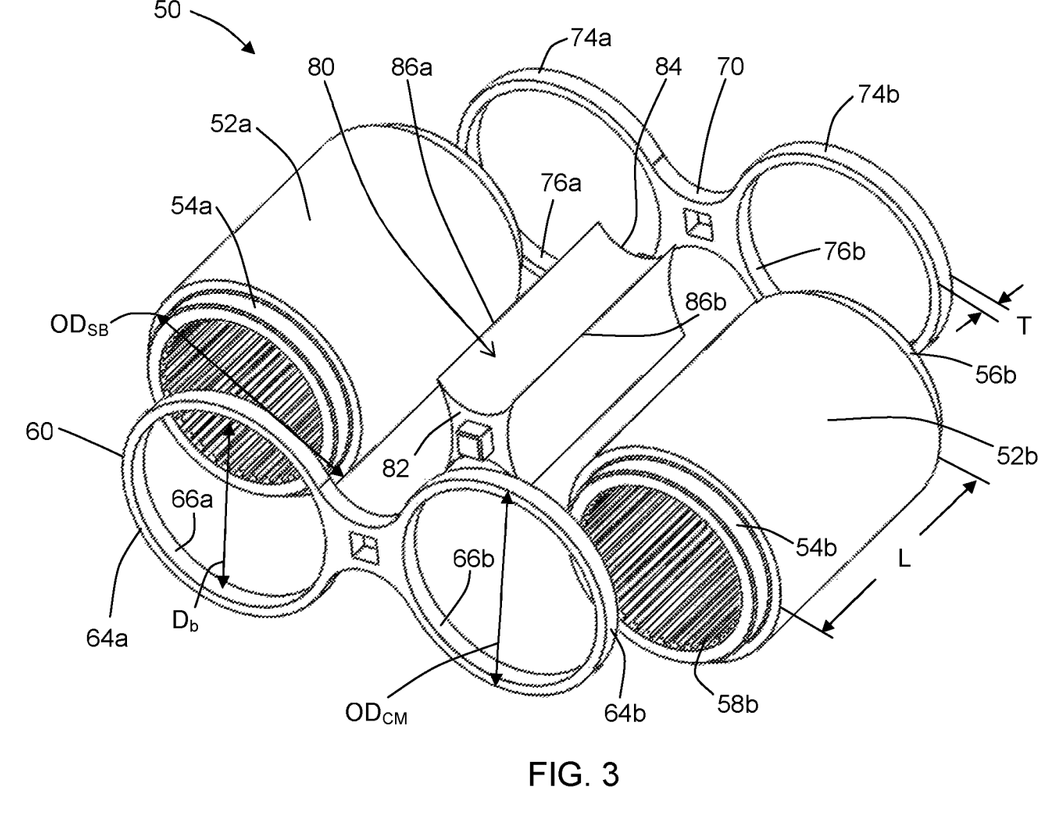
FIG. 3 is an isometric view of a screw shaft support according to exemplary embodiments of the disclosure.

According to exemplary embodiments, the screw shaft support 50 disclosed herein may operate as a bearing that can be positioned anywhere along the length of the TSM shafts 46, 48 although near the downstream side 30 may be more beneficial to prevent wobble and contact of screw segments and screw sets in the high pressure pumping zone. Turning to FIGS. 1-3, the screw shaft support 50 of the twin screw extruder machine 20 according to exemplary embodiments of the disclosure includes a first spacer bearing 52a disposed on the first screw shaft 46 and a second spacer bearing 52b disposed on the second screw shaft 48. A first cross member 60 having a first loop 64a and a second loop 64b is coupled to the first spacer bearing 52a and the second spacer bearing 52b. The first loop 64a has an inner bearing surface 66a slidably coupled to a bearing surface 54a of the first spacer bearing 52a. Similarly, the second loop 64b has an inner bearing surface 66b to slidably couple to an outer bearing surface 54b of the second spacer bearing 52b.

According to exemplary embodiments, the screw shaft support 50 includes a connection member 80 to connect the first cross member 60 to a second cross member 70 spaced apart from the first cross member 60 by the connection member 80. The second cross member 70 has a first loop 74a and a second loop 74b to slidably couple to the first spacer bearing 52a and the second spacer bearing 52b. The first loop 74a of the second cross member 70 has an inner bearing surface 76a slidably coupled to a second bearing surface 56a of the first spacer bearing 52a. Similarly, the second loop 74b of the second cross member 70 has an inner bearing surface 76b to slidably couple to a second outer bearing surface 56b of the second spacer bearing 52b.

Figure 4:
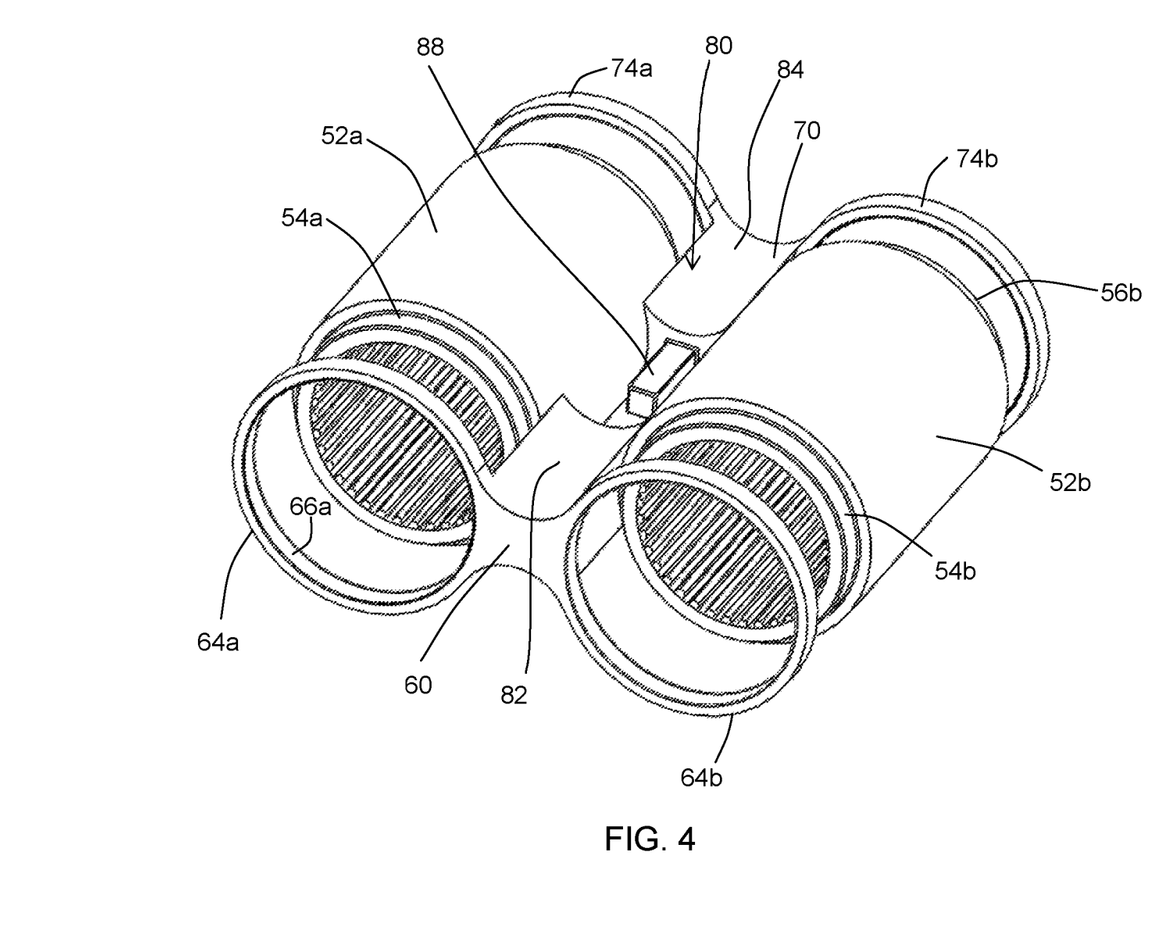
FIG. 4 is an isometric view of a screw shaft support according to other exemplary embodiments of the disclosure.
Figure 5A:
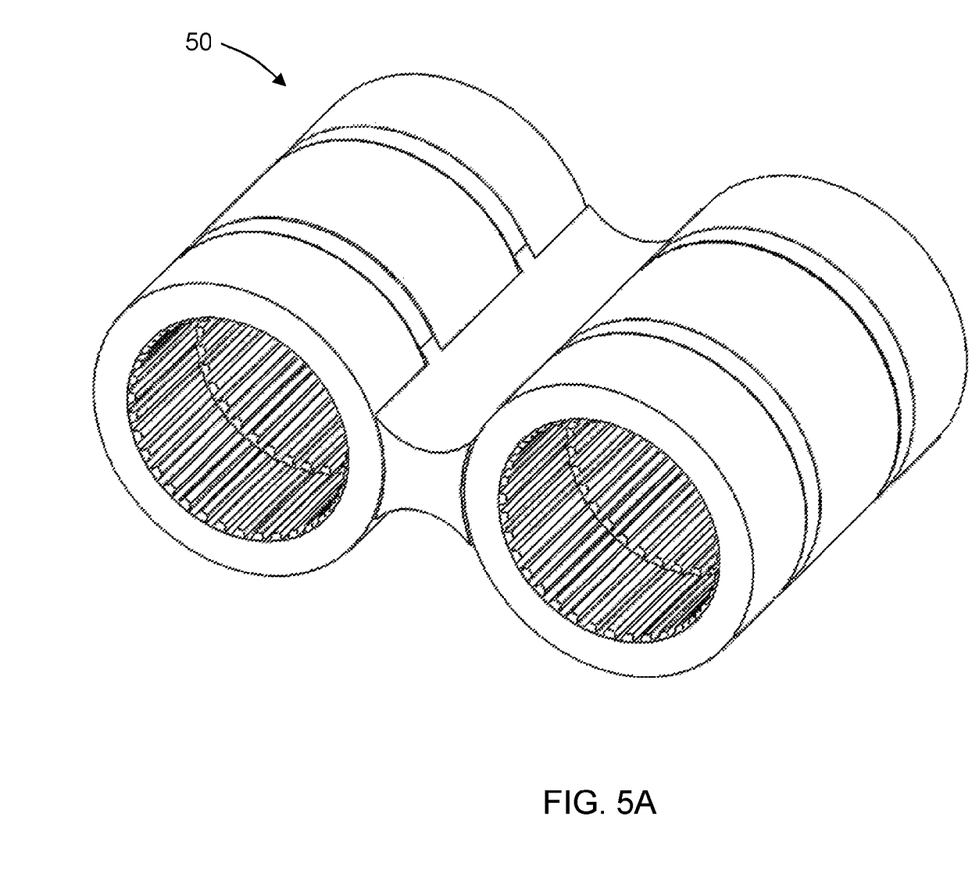
FIGS. 5A and 5B are isometric views of a screw shaft support according to other exemplary embodiments of the disclosure.
Figure 5B:
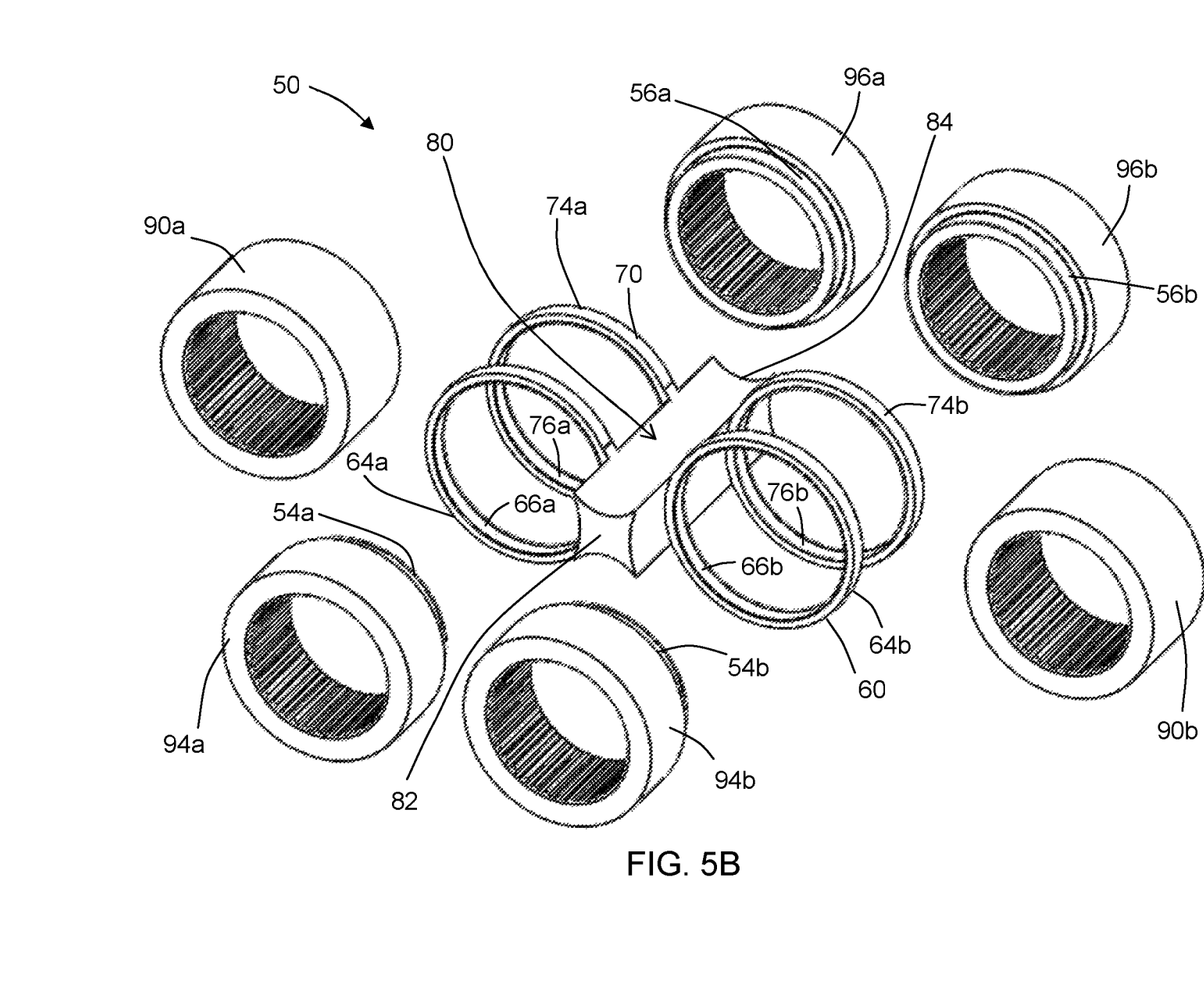

The bearing surfaces 54a, 54b, 56a, 56b are shown in FIGS. 3-5 as circumferential notches in the peripheral surfaces at the axial ends of the first spacer bearing 52a and the second spacer bearing 52b. Adjacent screw sets 38, 40 may hold the first cross member 60 and the second cross member 70 to the first spacer bearing 52a and the second spacer bearing 52b. Alternatively or in addition, the connection member 80 may hold the first cross member 60 and the second cross member 70 to the first spacer bearing 52a and the second spacer bearing 52b.

Accordingly, when the shafts 46, 48 rotate, screw sets 38, 40 and spacer bearings 52a, 52b rotate with the respective shafts 46, 48. In contrast, cross members 60, 70 and connection member 80 remain substantially stationary to provide shaft-to-shaft support for the axial twin screws and anchor a flow modifier within the flow stream. Cross members 60, 70 ride on the bearing surfaces 54a, 54b, 56a, 56b.

The connection member 80 is disposed between the first spacer bearing 52a and the second spacer bearing 52b, and the connection member 80 is connected to the first cross member 60 at a first end 82 and the second cross member 70 at a second end 84 thereof. The connection member 80 may have a first edge 86a that scrapes a portion of batch material off of the peripheral surface of the first spacer bearing 52a. The first edge 86a may act as a plow to remove material from the first spacer bearing 52a. The spacer bearings 52a, 52b may increase batch material contact area with hot or cool barrel 22 surfaces. The connection member 80 may have a second edge 86b that scrapes a portion of batch material off of the peripheral surface of the second spacer bearing 52b. The second edge 86b may also act as a plow to remove material from the second spacer bearing 52b. When the drive shafts 46, 48 rotate in opposite directions, the first edge 86a and the second edge 86b may be on the same upper or lower surface of the connection member 80. When the drive shafts 46, 48 rotate in the same direction, the first edge 86a and the second edge 86b may be on the opposite upper or lower surface of the connection member 80 from each other. The connection member 80 may include additional edges as shown in FIGS. 3-6 that scrape a portion of batch material off of the outermost radial (peripheral) surface of at least one of the first spacer bearing 52a and the second spacer bearing 52b regardless of the rotation direction of the drive shafts 46, 48.

The first spacer bearing 60 and the second spacer bearing 70 may also include inner axial surfaces 58a, 58b configured to couple to the first drive shaft 46 and the second drive shaft 48 of the twin screw extruder machine (TSM) 20, respectively. The first spacer bearing 60 and the second spacer bearing 70 may be removably coupled via splines, keyway structures, set screws, etc. Still, the first spacer bearing 60 and the second spacer bearing 70 can be non-removably coupled to the drive shafts 46, 48, such as by adhesives, welding, etc.

According to exemplary embodiments the first cross member 60 is integrally formed with the first loop 64a and the second loop 64b thereof in a figure 8 or barbell arrangement as shown in FIGS. 2-4. Similarly, the second cross member 70 may be integrally formed with the first loop 74a and the second loop 74b of the second cross member 70 to form a second figure 8 or barbell arrangement.

At least one of the first cross member 60 and the second cross member 70 may include an opening configured to extrude batch material. While not required in all aspects, the connection member 80 may consist of more than one body (tie rod) to connect the first cross member 60 to the second cross member 70. Each body of the connection member 80 may span the space between the first cross member 60 and the second cross member 70 independently. Alternatively, a body of the connection member 80 may be connected to another body at some midpoint between the first cross member 60 and the second cross member 70, for example, upstream or downstream of the midpoint. When at least one of the first cross member 60 and the second cross member 70 include an opening, the opening and the connection member body or bodies may not overlap to extrude batch material through the opening.

Additionally, the connection member 80 may include a first section 82, a second section 84, and a connector 86 to connect the first section 82 to the second section 84 (FIG. 4). The first section 82 may be connected or formed integrally with the first cross member 60 and the second section 84 may be connected or formed integrally with the second cross member 70 such that when the connector 86 connects the first section 82 to the second section 84, the connection member 80 connects the first cross member 60 to the second cross member 70.

As illustrated in FIG. 3, the spacer bearings 52a, 52b have length L that spans the space from the first cross member 60 to the second cross member 70. L can be selected to match a desired performance of shearing, cooling, heating, or the like in the batch, or of providing sufficient rigidity to support of the twin screw shafts 46, 48. The spacer bearings 52a, 52b have no flights and bearing surfaces 54a, 54b, 56a, 56b incorporated at each end according to the exemplary embodiment shown in FIG. 3. The outer diameter $OD_{SB}$ of the spacer bearings 52a, 52b may be set at any functional diameter, for example, $OD_{SB}$ may be between the element root diameter of the screw sets 38, 40 and the diameter equal to half the shafts 46, 48 centerline to centerline distance.

As illustrated in FIG. 3, the outer diameter $OD_{CM}$ of the cross member loops 64a, 64b, 74a, 74b may be set to the regular element root diameter of the screw sets 38, 40. However, if desired, the outer diameter $OD_{CM}$ of the cross member loops 64a, 64b, 74a, 74b may extend all the way to the respective barrel chamber 24, 26 diameter. Such a large diameter may create a restriction such as shear discs. Using this device as a shear disc provides an improvement over standard shear discs by elimination of the asymmetry that exists using two independent discs.

The cross members' loops 64a, 64b, 74a, 74b have bearing surfaces of diameter $D_b$ shown in FIG. 3. These bearing surface diameters $D_b$ of the cross members' loops 64a, 64b, 74a, 74b may be slightly greater than the spacer bearings 52a, 52b bearing surfaces 54a, 54b, 56a, 56b that they fit over. For example, the bearing surface diameter $D_b$ may be about 0.010 inch (0.254 mm) greater than the diameter of the bearing surfaces 54a, 54b, 56a, 56b.

The cross members 60, 70 may be rigid bodies that have two through holes (loops 64a, 64b, 74a, 74b) that fit over the bearing surfaces 54a, 54b, 56a, 56b of the spacer bearings 52a, 52b on each shaft 46, 48 and hold the shafts apart at normally the shaft centerline to centerline distance apart. If desired the through holes 64a, 64b, 74a, 74b can be offset to hold the shafts 46, 48 apart at a desired distance for flow modifications via intentionally creating tighter and looser sections between the shaft elements and the barrel wall. The thickness, T, of the cross members 60, 70 can be varied and depends on desired use and forces exerted on the screw shaft support 50.

The first cross member 60 and the second cross member 70 may be adjustable to change a spacing between the first spacer bearing 52a and the second spacer bearing 52b.

The outer diameter of the spacer bearings 52a, 52b may be determined to adjust a space between the spacer bearing outermost radial (peripheral) surface and the barrel wall 22.

At least one of the first cross member 60 and the second cross member 70 may be configured to form a vacuum plug in the twin screw extruder 20.

According to exemplary embodiments of the disclosure shown in FIGS. 5A and 5B, the two ends 82, 84 of the connection member extend beyond the first and second cross members 60, 70. Additional spacer sets 90a, 90b may be disposed on the drive shafts 46, 48 between the first cross member 60 and the second cross member 70. Additional spacer sets 90a, 90b may rotate with the drive shafts 46, 48.

Upstream spacer bearings 94a, 94b disposed on the drive shafts 46, 48 may include bearing surfaces 54a, 54b to couple with bearing surfaces 66a, 66b of the first cross member 60. Downstream spacer bearings 96a, 96b disposed on the drive shafts 46, 48 may include bearing surfaces 56a, 56b to couple with bearing surfaces 76a, 76b of the second cross member 70. The first cross member 60 and the second cross member 70 may be integrally formed with connection member 80 as shown in FIGS. 5A and 5B. In such an arrangement of the screw shaft support 50, adjacent screw set members of screw sets 38, 40 may hold the spacer bearings 94a, 94b, 96a, 96b in place on the drive shafts 46, 48 during rotation while the cross member loops 64a, 64b, 74a, 74b ride on the bearing surfaces 54a, 54b, 56a, 56b so that the rigid body of cross members 60, 70 formed integrally with the connection member 80 does not move.

Figure 6:
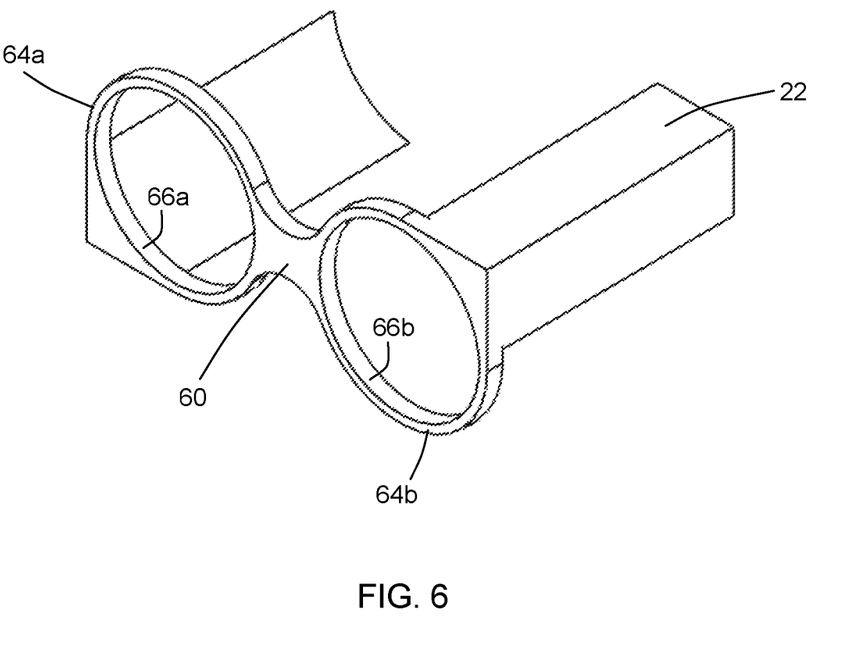
FIG. 6 is an isometric view of a screw shaft support integral with a barrel section according to other exemplary embodiments of the disclosure.

FIG. 6 illustrates an exemplary embodiment of the disclosure where a cross member 60, including first loop 64a and second loop 64b, is integrally formed with the barrel 22.

An exemplary embodiment of a method of using the twin-screw extruder 20 for manufacturing a ceramic honeycomb green body to produce a porous honeycomb filter will now be described. It is to be understood that more or less, similar or different method steps can also be included.

The method can include the step of providing the barrel 22 with the pair of chambers 24, 26 formed therein in communication with each other. The barrel 22 can also include the discharge port 36 and the extrusion molding die 34 coupled with respect to the discharge port 36 of the barrel 22. The method can further include the steps of providing the first screw set 38 rotatably mounted at least partially within one of the pair of chambers 24, and providing the second screw set 40 rotatably mounted at least partially within the other of the pair of chambers 26. The screw sets 38, 40 can be coupled to the driving mechanism 42 directly or indirectly, such as through drive shafts 46, 48.

The method can further include the step of providing a flowable ceramic batch material into the barrel 22, such as generally along the direction of arrow I of FIG. 1 via the material supply port 32 located generally towards an upstream side 28 of the barrel 22. The batch material can be supplied generally continuously. In addition or alternatively, a cooling medium, such as cooling water or the like, can be provided through the cooling structure coupled to the barrel 22 to cool the batch material in contact with the walls of the barrel 22. The screw sets 38, 40 can be further provided with pumping screw segments 44a, 44b for pumping the batch material towards the downstream side 30 of the barrel 22 generally along the direction of arrow II of FIG. 1.

The method can include the step of scraping batch material off of the outermost radial (peripheral) surface of at least one of the first spacer bearing 52a and the second spacer bearing 52b. The scraping can be provided by edges 86a, 86b of the connection member 80 disposed between the first spacer bearing 52a and the second spacer bearing 52b.

The method can include the step of contiguous and symmetric (even) shearing of the batch material provided by large cross member loops 64a, 64b, 74a, 74b having outer diameters $OD_{CM}$ that extend all the way to the respective barrel chamber 24, 26 diameter creating a dual shear disc restriction. Using the screw shaft support 50 as a shear disc provides an improvement over standard shear discs by elimination of the asymmetry that may exist using two independent discs.

The method can further include the step of mixing by extruding the ceramic batch material through opening 72 in screw shaft support 50 (FIG. 2). Opening 72 may be any manner of single or plural openings in at least one of the cross members 60, 70.

The method can further include the step of mixing the ceramic batch material circumferentially between the pair of chambers 24, 26 at the discharge port 36 of the barrel 22. For example, each of the first and second screw sets 38, 40 can be provided with a lobed kneading segment (not shown) for performing circumferential mixing.

The method can further include the step of mixing the ceramic batch material axially within each of the pair of chambers 24, 26 at the discharge port 36 of the barrel 22. For example, each of the first and second screw sets 38, 40 can be provided with a raker blade segment (not shown) for performing the axial mixing. The method can further include the step of extruding the ceramic batch material through the extrusion die 34, such as generally along the direction of arrow III of FIG. 1, to produce the ceramic honeycomb green body.

Thus, exemplary embodiments of the disclosure provide a screw shaft support of a twin screw machine (TSM) extruder to keep shafts an equidistance apart for stable operation reducing preferential or variable pumping or shearing of material.

The exemplary embodiments of the screw shaft support improves delivery of uniformly sheared batch by preventing tight gaps/reduced clearance on one side of barrel and larger clearances on the other side.

The exemplary embodiments of the screw shaft support reduce element to element contact which can cause wear and chipping of expensive elements prolonging life and reducing premature element failure.

The exemplary embodiments of the screw shaft support enables the use of fragile elements such as ceramic elements.

The exemplary embodiments of the screw shaft support enables anchoring other elements in the flow stream for flow modifications. For example, the connection member may have a plow like edge that scrapes material off a spacer element. As another example, spacer bearings can be used to increase batch contact area with hot or cool barrel surfaces.

According to exemplary embodiments of the disclosure, the screw shaft support can be positioned in any axial location within a TSM to provide many different functions such as a contiguous and even/symmetric shear disc (instead of the staggered type) in the back end of a TSM and/or used as a shaft alignment device in the front end of a TSM to prevent shaft wobble.

Exemplary embodiments of the disclosure also provide a TSM including the screw shaft support disposed on axially extending twin shafts to maintain the twin shafts a constant and equal distance apart for improved operation and efficiency.

Reference throughout this specification to exemplary embodiments and similar language throughout this specification may, but do not necessarily, refer to the same embodiment. Furthermore, the described features, structures, or characteristics of the subject matter described herein with reference to an exemplary embodiment may be combined in any suitable manner in one or more exemplary embodiments. In the description, numerous specific details are provided, such as examples of, materials, coatings, channel and filter geometry, etc., to provide a thorough understanding of embodiments of the subject matter. One skilled in the relevant art will recognize, however, that the subject matter may be practiced without one or more of the specific details, or with other methods, components, materials, and so forth. In other instances, well-known structures, materials, or operations are not shown or described in detail to avoid obscuring aspects of the disclosed subject matter.

The methods described above are generally set forth as logical flow. As such, the depicted order and labeled steps are indicative of representative embodiments. Other steps and methods may be conceived that are equivalent in function, logic, or effect to one or more steps, or portions thereof, of the methods illustrated in the schematic diagrams. Additionally, the format and symbols employed are provided to explain the logical steps of the schematic diagrams and are understood not to limit the scope of the methods illustrated by the diagrams. Additionally, the order in which a particular method occurs may or may not strictly adhere to the order of the corresponding steps shown.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A screw shaft support of a twin screw extruder, comprising:
    a first spacer bearing configured to be disposed on a first screw shaft and a second spacer bearing configured to be disposed on a second screw shaft;
    a first cross member comprising a first loop slidably coupled to the first spacer bearing and a second loop slidably coupled to the second spacer bearing; and
    a second cross member spaced apart from the first cross member by a connection member, the second cross member comprising a first loop slidably coupled to the first spacer bearing and a second loop slidably coupled to the second spacer bearing,
    wherein the connection member is disposed between the first spacer bearing and the second spacer bearing, and the connection member is connected to the first cross member at a first end and the second cross member at a second end.

2. The screw shaft support of claim 1, wherein the connection member comprises a first scraper edge configured to scrape a portion of plasticized batch material on a peripheral surface of the first spacer bearing.

3. The screw shaft support of claim 2, wherein the connection member comprises a second scraper edge configured to scrape a portion of plasticized batch material on a peripheral surface of the second spacer bearing.

4. The screw shaft support of claim 1, wherein the first loop of the first cross member is slidably coupled to the first spacer bearing at a first bearing surface comprising a circumferential notch at a periphery of a first axial end of the first spacer bearing,
    the second loop of the first cross member is slidably coupled to the second spacer bearing at a first bearing surface comprising a circumferential notch at a periphery of a first axial end of the second spacer bearing,
    the first loop of the second cross member is slidably coupled to the first spacer bearing at a second bearing surface comprising a circumferential notch at a periphery of a second axial end of the first spacer bearing, and
    the second loop of the second cross member is slidably coupled to the second spacer bearing at a second bearing surface comprising a circumferential notch at a periphery of a second axial end of the second spacer bearing.

5. The screw shaft support of claim 1, wherein the first spacer bearing further comprises an inner axial surface configured to couple to a first screw shaft of a twin screw extruder, the inner axial surface comprising at least one of a key way and a spline, and
    the second spacer bearing further comprises an inner axial surface configured to couple to a second screw shaft of a twin screw extruder, the inner axial surface comprising at least one of a key way and a spline.

6. The screw shaft support of claim 1, wherein the first cross member, the first loop, and the second loop thereof constitute a first figure 8 arrangement, and
    the second cross member, the first loop, and the second loop thereof constitute a second figure 8 arrangement.

7. The screw shaft support of claim 1, wherein at least one of the first cross member and the second cross member comprise an opening configured to extrude a plasticized batch material.

8. The screw shaft support of claim 1, wherein the connection member comprises a connector, a first section, and a second section connected to the first section at the connector.

9. The screw shaft support of claim 1, wherein the first cross member and the second cross member are adjustable to change a spacing between the first spacer bearing and the second spacer bearing.

10. The screw shaft support of claim 1, wherein the first spacer bearing axis is substantially parallel to the second spacer bearing axis.

11. The screw shaft support of claim 1, wherein the first cross member and the second cross member are configured to maintain twin screw shafts spaced a constant distance apart.

12. The screw shaft support of claim 1, wherein at least one of the first cross member and second cross member is configured to form a vacuum plug in a twin screw extruder.

13. A twin screw extruder, comprising:
a barrel comprising a chamber and a discharge port;
an extrusion molding die coupled to the discharge port of the barrel;
an axially extending first screw shaft;
an axially extending second screw shaft; and
a screw shaft support comprising:
 a first spacer bearing configured to be disposed on the first screw shaft and a second spacer bearing configured to be disposed on the second screw shaft;
 a first cross member comprising a first loop slidably coupled to the first spacer bearing and a second loop slidably coupled to the second spacer bearing; and
 a second cross member spaced apart from the first cross member by a connection member, the second cross member comprising a first loop slidably coupled to the first spacer bearing and a second loop slidably coupled to the second spacer bearing,
 wherein the connection member is disposed between the first spacer bearing and the second spacer bearing, and the connection member is connected to the first cross member at a first end and the second cross member at a second end.

14. The twin screw extruder of claim 13, wherein the connection member comprises a first scraper edge configured to scrape a portion of plasticized batch material on a peripheral surface of the first spacer bearing.

15. The twin screw extruder of claim 14, wherein the connection member comprises a second scraper edge configured to scrape a portion of plasticized batch material on a peripheral surface of the second spacer bearing.

16. The twin screw extruder of claim 13, wherein the first loop of the first cross member is slidably coupled to the first spacer bearing at a first bearing surface comprising a circumferential notch at a periphery of a first axial end of the first spacer bearing,
the second loop of the first cross member is slidably coupled to the second spacer bearing at a first bearing surface comprising a circumferential notch at a periphery of a first axial end of the second spacer bearing,
the first loop of the second cross member is slidably coupled to the first spacer bearing at a second bearing surface comprising a circumferential notch at a periphery of a second axial end of the first spacer bearing, and
the second loop of the second cross member is slidably coupled to the second spacer bearing at a second bearing surface comprising a circumferential notch at a periphery of a second axial end of the second spacer bearing.

17. The twin screw extruder of claim 13, wherein the first spacer bearing further comprises an inner axial surface coupled to the first screw shaft, the inner axial surface comprising at least one of a key way and a spline, and
the second spacer bearing further comprises an inner axial surface coupled to the second screw shaft, the inner axial surface comprising at least one of a key way and a spline.

18. The twin screw extruder of claim 13, wherein the first cross member, the first loop, and the second loop thereof constitute a first figure 8 arrangement, and
the second cross member, the first loop, and the second loop thereof constitute a second figure 8 arrangement.

19. The twin screw extruder of claim 13, wherein at least one of the first cross member and the second cross member comprise an opening configured to extrude a plasticized batch material.

20. The twin screw extruder of claim 13, wherein the connection member comprises a connector, a first section, and a second section connected to the first section at the connector.

21. The twin screw extruder of claim 13, wherein the first cross member and the second cross member are adjustable to change a spacing between the first spacer bearing and the second spacer bearing.

22. The twin screw extruder of claim 13, wherein the first spacer bearing axis is substantially parallel to the second spacer bearing axis.

23. The twin screw extruder of claim 13, wherein the first cross member and the second cross member are configured to maintain the twin screw shafts spaced a constant distance apart.

24. The twin screw extruder of claim 13, wherein at least one of the first cross member and second cross member is configured to form a vacuum plug in the twin screw extruder.

* * * * *